United States Patent [19]

Pascal

[11] Patent Number: 5,158,267
[45] Date of Patent: Oct. 27, 1992

[54] AIRCRAFT SHOCK ABSORBER

[75] Inventor: Martin Pascal, Breuillet, France

[73] Assignee: MESSIER-BUGATTI, Velizy-Villacoublay, France

[21] Appl. No.: 713,525

[22] Filed: Jun. 12, 1991

[30] Foreign Application Priority Data

Jun. 18, 1990 [FR] France ................................ 90 07574

[51] Int. Cl.⁵ ............................ F16F 9/06; F16F 9/32; F16F 9/34
[52] U.S. Cl. .................................. 267/64.12; 188/319; 244/102 SS; 244/104 FP; 267/64.16; 280/704; 280/6.12; 280/DIG. 1
[58] Field of Search ........................... 267/64.16, 64.12; 188/299, 319, 314; 280/704, 6.12, DIG. 1; 244/104 FP, 102 SS

[56] References Cited

U.S. PATENT DOCUMENTS

| 3,146,862 | 9/1964 | Winsen | 188/299 X |
| 4,630,788 | 12/1986 | Veaux et al. | 244/104 FP |
| 4,720,085 | 1/1988 | Shinbori et al. | 188/299 X |
| 5,014,966 | 5/1991 | Wang | 188/319 X |

FOREIGN PATENT DOCUMENTS 220237 11/1985 Japan .................................. 188/299

Primary Examiner—George E. A. Halvosa
Attorney, Agent, or Firm—Sixbey, Friedman, Leedom & Ferguson

[57] ABSTRACT

A shock absorber of the invention comprises a strut, a inner cylinder fixed to the strut and extending inside the strut, and a sliding cylinder mounted to slide inside the strut and associated with the inner cylinder to communicate with the inside thereof via throttling orifices and short-circuit orifices, a pump and control arrangement being provided to pump hydraulic liquid from the sliding cylinder into the inner cylinder so as to produce a retraction of the sliding cylinder into the strut when both the throttling and short-circuit orifices are closed. The throttle orifices produce a communication between the sliding cylinder and the inner cylinder which produces a normal damping operation of the strut while the short-circuit orifices provide a rapid release of the sliding cylinder from a retracted position and a control member selectively closes one or both of the orifices.

7 Claims, 3 Drawing Sheets

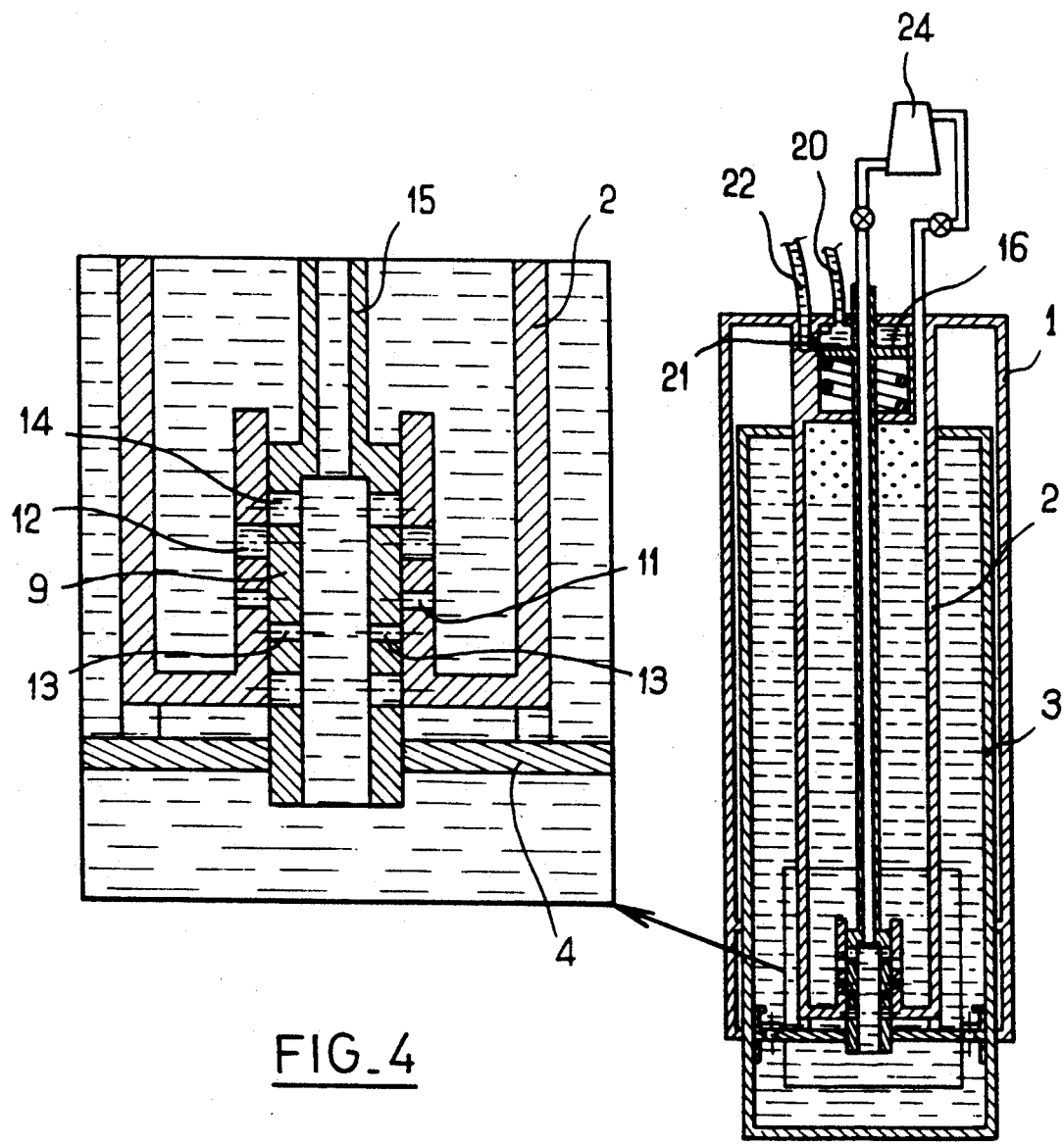
FIG_4
FIG_3

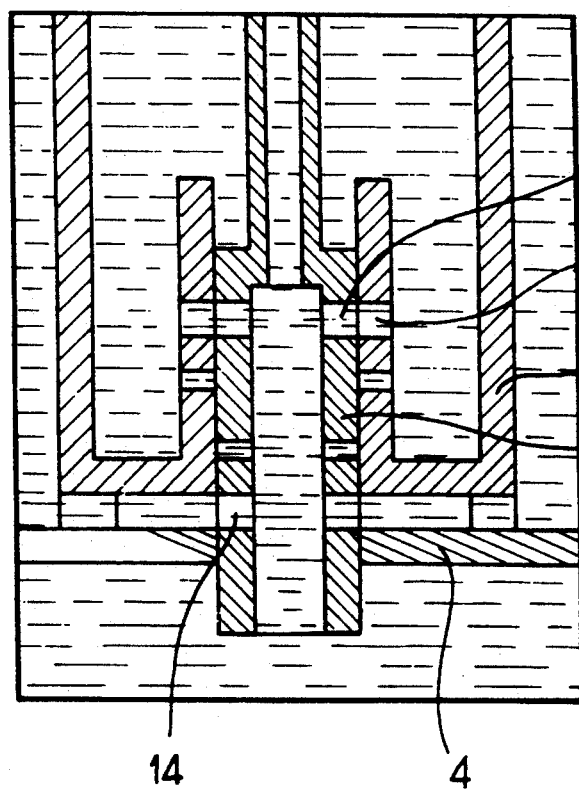
FIG_6
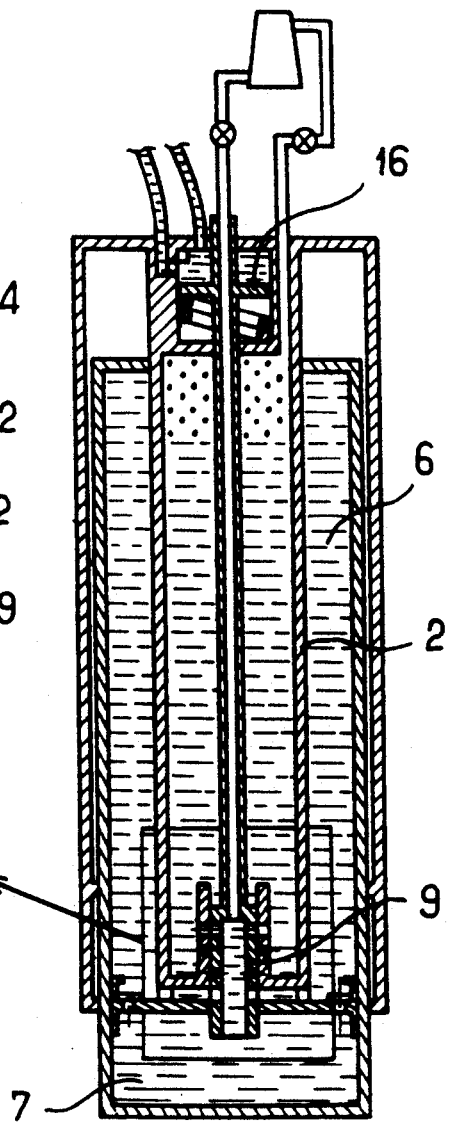
FIG_5

# AIRCRAFT SHOCK ABSORBER

The present invention relates to an aircraft shock absorber.

BACKGROUND OF THE INVENTION

It is desirable in aircraft shock absorbers to be able to adjust the degree of throttling as a function of the conditions under which the landing gear containing the shock absorber is being used, and in particular the throttling that applies during expansion of the hydraulic fluid contained in the shock absorber. It is also known that when the characteristics of the shock absorber need to be changed while it is in use, the general practice to use an external source of fluid under pressure acting on a piston moving inside the shock absorber.

SUMMARY OF THE INVENTION

The invention provides an aircraft shock absorber including a strut, a inner cylinder fixed to the strut and extending inside the strut, a sliding cylinder mounted to slide inside the strut and associated with the inner cylinder to communicate with the inside thereof via throttling orifices, the sliding cylinder and the inner cylinder being filled with a hydraulic liquid surmounted an overlying gas under pressure, wherein the shock absorber includes short-circuit orifices between the inner cylinder and the sliding cylinder, means for opening or closing the throttling orifices and the short-circuit orifices, and means for pumping hydraulic liquid from the sliding cylinder and into the inner cylinder.

Thus, by displacing the hydraulic liquid between the sliding cylinder and the inner cylinder after closing the throttling orifices and the short-circuit orifices, energy is stored that can subsequently be made available as a function of the operating circumstances applicable to the aircraft on which the shock absorber is mounted.

In an advantageous version of the invention, the throttling orifices and the short-circuit orifices are carried by a cylindrical wall element of the inner cylinder, and the means for opening and closing the throttling orifices comprise a slide connected to a control rod to slide inside the cylindrical wall portion, which slide includes orifices corresponding to the throttling orifices and to the short-circuit orifices disposed so as to avoid coming simultaneously into correspondence with the throttling orifices and the short circuit orifices of the inner cylinder. Thus, by acting on a single control member, it is possible to open and close all of the orifices.

Advantageously, the control rod is a hollow rod providing a connection between the sliding cylinder an the means of pumping the hydraulic liquid.

Also advantageously, the control rod is connected to a control piston disposed inside a control box at a top end of the inner cylinder, and preferably the control piston has a resilient member engaged with one face thereof, urging it towards a position in which the throttling orifices are open and the short-circuit orifices are closed, and has a control liquid acting on an opposite face thereof.

In a preferred embodiment of the invention, the control box includes a calibrated leak orifice for the control liquid, said leak orifice being disposed so that the control piston causes the throttling orifices and the short-circuit orifices to be closed when the control piston is flush with the calibrated leak orifice.

BRIEF DESCRIPTION OF THE DRAWINGS

An embodiment of the invention is described by way of example with reference to the accompanying drawings, in which:

FIG. 3 is a diagrammatic axial section view through a shock absorber of the invention in a position where its throttling orifices and short-circuit orifices are closed;

FIG. 4 is an enlarged view of the detail box of FIG. 3;

FIG. 5 is a diagrammatic axial section view through a shock absorber of the invention in its position where its short circuit orifices are open; and FIG. 6 is an enlarged view of the detail box of FIG. 5.

DETAILED DESCRIPTION

Figures 1, 2:
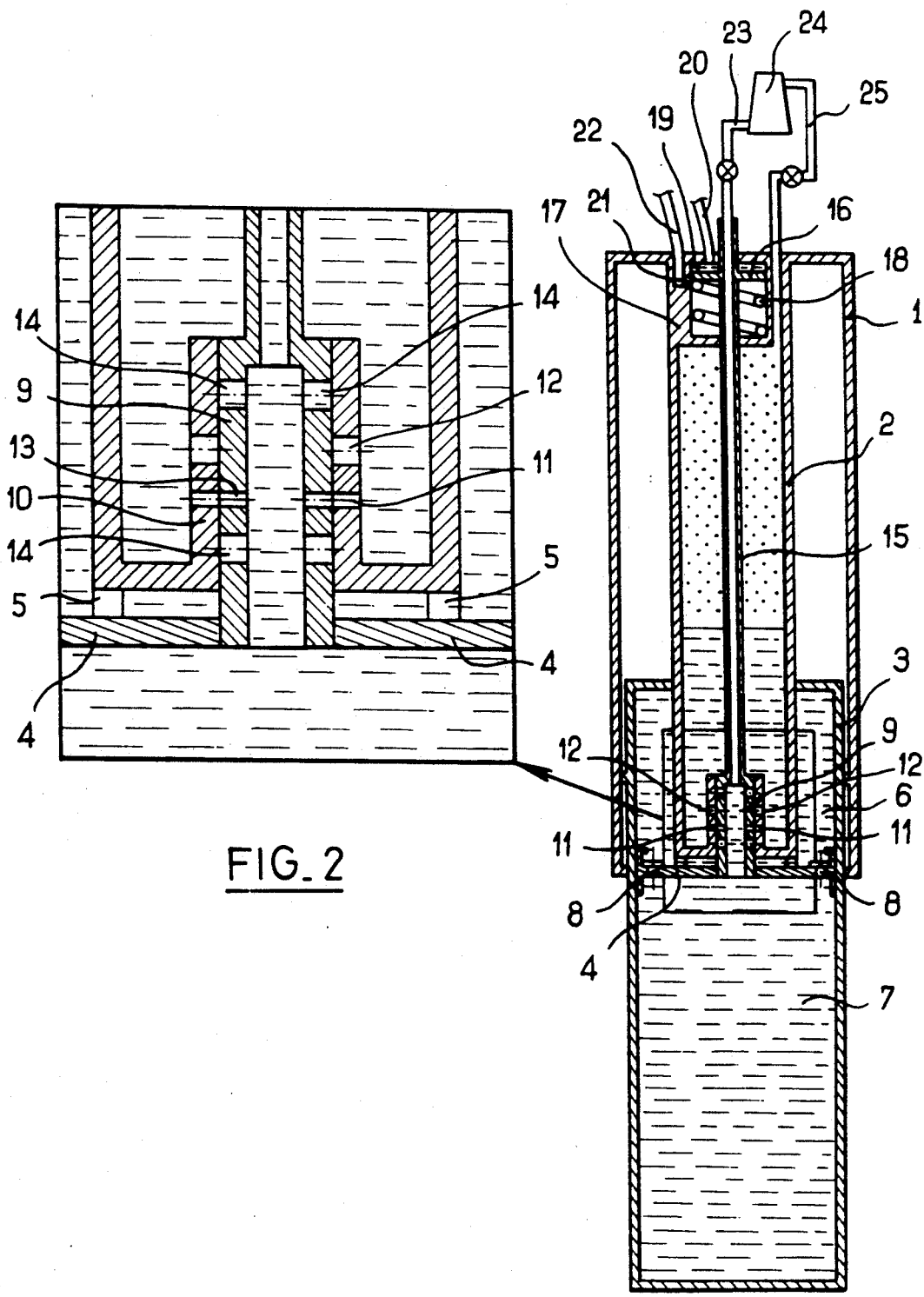
FIG. 1 is a diagrammatic axial section view through a shock absorber of the invention inn its normal-use position.
FIG. 2 is an enlarged view of the detail box of FIG. 1.

With reference to the figures, the shock absorber of the invention comprises a cylindrical strut 1 in which a inner cylinder 2 is fixed, being mounted coaxially inside the strut 1. A sliding cylinder 3 is mounted to slide in said the strut 1 around the inner cylinder 2, the sliding cylinder being associated in leakproof manner with the outside surface of the inner cylinder 2. A transverse plate 4 is fixed to the bottom of the inner cylinder 2 and is held at a small distance therefrom by spacers 5. The transverse plate 4 has its periphery associated in leakproof manner with the inside surface of the hollow piston 3, thereby delimiting an upper chamber 6 and a lower chamber 7 inside the sliding cylinder, the upper chamber and the lower chamber being interconnected via throttling and expansion non-return valves 8 mounted on the transverse plate 4. The transverse plate 4 also has a hollow cylindrical slide 9 mounted to slide inside a cylindrical wall element 10 extending to the bottom portion of the inner cylinder 2 and coaxial therewith. The cylindrical wall portion 10 of the inner cylinder includes throttling orifices 11 and short-circuit orifices 12.

The cylindrical slide 9 includes orifices 13 corresponding to the throttling orifices 11 in the inner cylinder 2 and it includes orifices 14 corresponding firstly to the short-circuit orifices 12 of the inner cylinder and secondly to the gap between the bottom end of the inner cylinder and the transverse plate 4.

The slide 9 is connected by a hollow control rod 15 to a control piston 16 disposed inside a control box 17 at the top end of the inner cylinder 2. The control piston 16 has a helical spring 18 acting against one of its face to urge the control piston upwards against an abutment 19 inside the control box 17. The face of the control piston 16 opposite to its face engaging the spring 18 has a control liquid applied thereagainst, which liquid is injected into the control box via an inlet duct 20. At an intermediate point of the side wall of the control box 17, there is a calibrated orifice 21 connected to an exhaust duct 22 for the control liquid.

The top end of the control rod 15 opens out to the outside of the strut 1 and is connected by a duct 23 to the admission orifice of a pump 24 whose delivery orifice is connected by a duct 25 to the top portion of the inner cylinder 2.

Hydraulic liquid is disposed inside the sliding cylinder 3 and also in the bottom portion of the inner cylinder 2, and it is acted upon by an overlying gas under pressure.

The shock absorber of the invention operates as follows: in the normal, in-use position shown in FIGS. 1 and 2, no control liquid is applied to the top of the control piston 16 which is thus held against the abutment 19 by the spring 18. In this position, the orifices 13 of the slide 19 coincide with the throttling orifices 11 of the inner cylinder while the orifices 14 of the slide 19 are offset from the short-circuit orifices 12 of the inner cylinder and from the gap between the bottom end of the inner cylinder and the transverse plate 4. The shock absorber thus operates under normal conditions with expansion throttling via the throttling valves 8 and with compression and expansion throttling via the throttling orifices 11, 13.

When it is desired to prepare the shock absorber for special operating conditions, control fluid is applied to the duct 20 at a pressure suitable for overcoming the force exerted by the spring 18 and at a flow rate which corresponds to the flow section of the calibrated orifice 21. The control piston 16 is thus pushed downwards until its top face comes flush with the calibrated orifice 21. As shown in FIG. 3, the control piston 16 remains in stable equilibrium in this position so long as the flow rate of control fluid into the duct 20 remains equal to the flow rate of fluid through the calibrated orifice 21. In this position of the control piston 16, the slide 9 is offset relative to its initial position such that the orifices 13 of the slide 9 (see FIG. 4) no longer coincide with the throttling orifices 11 of the inner cylinder 2, while the orifices 14 are not yet level with the short-circuit orifices 12. In this position of the slide 9, the connection between the inside of the inner cylinder 2 and the inside of the sliding cylinder 3 is interrupted and switching on the pump 24 serves to transfer hydraulic liquid from the sliding cylinder 3 to the inside of the inner cylinder 2. As such pumping continues, the sliding cylinder 3 retracts into the strut 1, as shown in FIG. 3, while the pressure of the compressed gas inside the inner cylinder 2 is increased.

When it is desired to make use of the energy accumulated in this way, the rate at which control liquid flows along the duct 20 is increased or the calibrated orifice 21 is closed so that the control piston 16 is pushed downwards into the position shown in FIG. 5. In this position, the slide 9 takes up the position shown in FIG. 6 in which the orifices 14 of the slide 9 coincide firstly with the short-circuit orifices 12 of the inner cylinder 2, and secondly with the gap between the bottom end of the inner cylinder 2 and the transverse plate 4. The hydraulic liquid then flows with practically no throttling out from the inner cylinder 2 and the upper chamber 6 of the sliding cylinder into the lower chamber 7 of the sliding cylinder and the shock absorber therefore expands quickly. The pressure of the control liquid is then reduced and the shock absorber returns to its normal operating conditions as shown in FIGS. 1 and 2.

Naturally, the invention is not limited to the embodiment described, and various embodiments maybe provided without going beyond the scope of the invention. In particular, although the shock absorber of the invention has been shown with a sliding cylinder associated with inner cylinder to slide in leakproof manner relative to the outside surface thereof, it would also be possible to implement the invention using a sliding cylinder associated in leakproof manner with the transverse plate 4 only. In this case, the throttling valves 8 are eliminated and the transverse plate 4 is associated in leakproof manner with the bottom end of the inner cylinder 2. The portion of the sliding cylinder lying between the transverse plate 4 and the to end of the sliding cylinder is then merely filled with air at atmospheric pressure. In normal operation, expansion throttling is then provided solely by the throttling orifices 11 and 13.

It is also possible to control the position of the slide 9 by means of a control rod associated with an electric motor. It is also possible to use a solid control rod and provide a separate duct for connecting the lower chamber 7 of the sliding cylinder 3 to the pump 24.

I claim:

1. An aircraft shock absorber including a strut, an inner cylinder fixed to the strut and extending inside the strut, a sliding cylinder mounted to slide along the inner cylinder inside the strut and associated with the inner cylinder to communicate with the inside thereof via throttling orifices, the sliding cylinder and the inner cylinder being filled with a hydraulic liquid that is acted upon by an overlying gas under pressure, wherein the shock absorber includes flow control means for changing the performance characteristics of the shock absorber, said flow control means comprising short-circuit orifices between the inner cylinder and the sliding cylinder, means for selectively opening and closing at least one of the throttling orifices and the short-circuit orifices, and means for pumping hydraulic liquid from the sliding cylinder into the inner cylinder, a normal operation of said shock absorber being produced when said throttling orifices are open and said short-circuit orifices are closed, said means for pumping acting to retract the sliding cylinder into the strut and to compress said gas when the throttling orifices and the short-circuit orifices are both closed with a rapid expansion of the shock absorber being produced upon opening of the short-circuit orifices thereafter.

2. A shock absorber according to claim 1, wherein the throttling orifices and the short-circuit orifices are carried by a cylindrical wall element of the inner cylinder, and wherein the means for opening and closing the throttling orifices comprise a slide connected to a control rod to slide inside the cylindrical wall portion.

3. A shock absorber according to claim 2, wherein the control rod is a hollow rod providing a connection between the sliding cylinder and the means for pumping the hydraulic liquid.

4. A shock absorber according to claim 2, wherein the control rod is connected to a control piston disposed inside a control box at a top end of the inner cylinder.

5. A shock absorber according to claim 4, wherein the control piston has a resilient member engaged with one face thereof urging it towards a position in which the throttling orifices are open and the short-circuit orifices are closed, and has a control liquid acting on an opposite face thereof.

6. A shock absorber according to claim 5, wherein the control box includes a calibrated leak orifice for the control liquid said leak orifice being disposed so that the control piston causes the throttling orifices and the short-circuit orifices to be closed when the control piston is flush with the calibrated leak orifice.

7. An aircraft shock absorber comprising a strut, an inner cylinder fixed to the strut and extending inside the strut, a sliding cylinder mounted to slide inside the strut and around said inner cylinder in sliding contact therewith, the sliding cylinder and the inner cylinder being filled with a hydraulic liquid that is acted upon by an overlying gas under pressure, a set of throttling orifices for producing a throttled flow of hydraulic liquid between the sliding cylinder and the inner cylinder, a set of short-circuit orifices that are larger than said throttling orifices for enabling a substantially free flow of hydraulic liquid between the sliding cylinder and the inner cylinder, flow control means for selectively closing only said set of throttling orifices, only said set of short-circuit orifices and both of said sets of orifices, and means for pumping hydraulic liquid from the sliding cylinder into the inner cylinder for retraction of the sliding cylinder into the strut with compression of said gas when both of said sets of orifices are closed.

* * * * *